(12) United States Patent
Krol et al.

(10) Patent No.: US 9,709,083 B2
(45) Date of Patent: Jul. 18, 2017

(54) SPRING ENABLED AUDIO DEVICE MOUNTING APPARATUS

(71) Applicant: DRUM WORKSHOP, INC., Oxnard, CA (US)

(72) Inventors: Andrzej J. Krol, Wayne, NJ (US); Victor Filonovich, Clifton, NJ (US); Sergio G. Bonsignore, Ridgewood, NY (US)

(73) Assignee: DRUM WORKSHOP, INC., Oxnard, CA (US)

( * ) Notice: Subject to any disclaimer, the term of this patent is extended or adjusted under 35 U.S.C. 154(b) by 0 days.

(21) Appl. No.: 14/957,446

(22) Filed: Dec. 2, 2015

(65) Prior Publication Data

US 2016/0157003 A1    Jun. 2, 2016

Related U.S. Application Data

(60) Provisional application No. 62/086,701, filed on Dec. 2, 2014, provisional application No. 62/086,705, filed on Dec. 2, 2014.

(51) Int. Cl.

| | |
|---|---|
| *F16M 13/00* | (2006.01) |
| *F16B 2/12* | (2006.01) |
| *F16M 13/02* | (2006.01) |
| *F16B 1/00* | (2006.01) |
| *H04R 1/08* | (2006.01) |
| *G10D 13/02* | (2006.01) |
| *G10G 7/00* | (2006.01) |
| *H04R 1/02* | (2006.01) |

(52) U.S. Cl.
CPC .................. *F16B 2/12* (2013.01); *F16B 1/00* (2013.01); *F16M 13/022* (2013.01); *G10D 13/02* (2013.01); *G10G 7/00* (2013.01); *H04R 1/025* (2013.01); *H04R 1/08* (2013.01); *F16B 2001/0035* (2013.01); *H04R 2201/025* (2013.01)

(58) Field of Classification Search
CPC .......... H04R 1/08; H04R 1/025; G10D 13/00; F16B 2/12; F16M 13/022
See application file for complete search history.

(56) References Cited

U.S. PATENT DOCUMENTS

| | | | |
|---|---|---|---|
| 4,127,053 A | 11/1978 | Cohen | |
| 4,185,811 A * | 1/1980 | Long | B25B 5/06 269/216 |

(Continued)

OTHER PUBLICATIONS

U.S. Appl. No. 13/694,519, filed Oct. 28, 2011, John J. Good.
U.S. Appl. No. 14/957,462, filed Dec. 2, 2015, Krol, et al.
U.S. Appl. No. 62/086,705, filed Dec. 2014, Krol, et al.

*Primary Examiner* — Amy Sterling
(74) *Attorney, Agent, or Firm* — Koppel, Patrick, Heybl & Philpott

(57) ABSTRACT

Devices that allow one or more objects to be quickly and easily attached to a musical device are described. In one embodiment, a spring-enabled mounting device is disclosed that allows a device such as a microphone to be removably attached to a musical instrument, such as a drum. The apparatus may be operable via the use of a single hand applying forces to manipulate one or more springs within the apparatus, thus allowing for convenient and timely attachment, removal, and/or repositioning of the object, such as a microphone, with respect to the instrument.

19 Claims, 2 Drawing Sheets

(56) References Cited

U.S. PATENT DOCUMENTS

| | | | | |
|---|---|---|---|---|
| 4,466,596 A | * | 8/1984 | Cohen | G10G 5/00 |
| | | | | 248/231.41 |
| 5,544,561 A | | 8/1996 | Isomi | 224/910 |
| 5,684,258 A | | 11/1997 | Liao | 224/910 |
| 5,703,306 A | | 12/1997 | Liao | 248/229.11 |
| 5,973,249 A | | 10/1999 | Liao | 84/421 |
| 6,093,878 A | | 7/2000 | Hoshino | 248/122.1 |
| 6,096,956 A | * | 8/2000 | Hoshino | G10D 13/00 |
| | | | | 84/421 |
| 6,274,797 B1 | | 8/2001 | Liao | 84/327 |
| 6,424,723 B1 | * | 7/2002 | Jing | H04R 1/08 |
| | | | | 381/361 |
| 7,943,840 B2 | | 5/2011 | Yoshino et al. | 84/421 |
| 7,964,781 B1 | | 6/2011 | Lovvorn | 84/327 |
| 8,563,841 B1 | | 10/2013 | Good | 84/411 |
| 9,024,163 B2 | | 5/2015 | Sato | 84/421 |
| 9,390,692 B2 | | 7/2016 | Good et al. | |
| 2014/0026735 A1 | | 1/2014 | Sato | 84/421 |
| 2016/0155432 A1 | | 6/2016 | Krol et al. | |

* cited by examiner

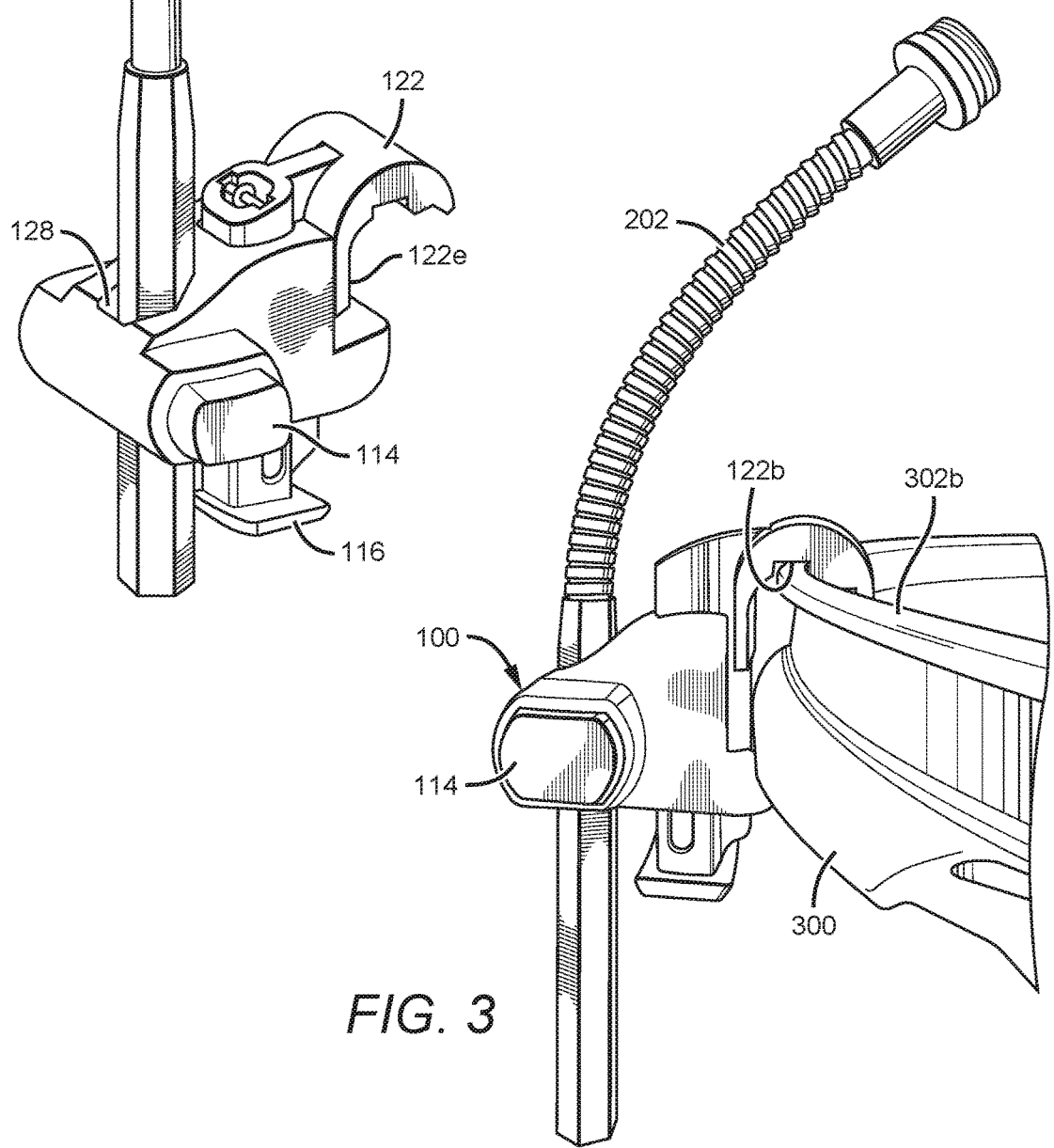

SPRING ENABLED AUDIO DEVICE MOUNTING APPARATUS

This application claims priority to U.S. Provisional Pat. App. No. 62/086,701, entitled "SPRING-ENABLED AUDIO DEVICE MOUNTING APPARATUS" and filed on Dec. 2, 2014, and claims priority to U.S. Provisional Pat. App. No. 62/086,705, entitled "CLIP-ON MOUNTING ASSEMBLY FOR MUSICAL INSTRUMENTS" and filed on Dec. 2, 2014, each of which is fully incorporated by reference herein in its entirety.

BACKGROUND

Field of the Disclosure

The present disclosure relates generally to music and audio devices, and more particularly to attaching one or more audio devices to a musical device.

Description of the Related Art

Whether a performance is live or recorded, it gives musicians an opportunity to display their talent and to receive feedback and recognition. Such feedback and recognition can significantly affect a musician's career. Positive feedback can inspire one to achieve greater levels of success and/or increase one's fan base, while negative feedback can damage one's psyche, be a source of discouragement, identify areas of weakness, and/or end one's career. Due to the significant impact that audience critique may have on a musician's livelihood, it is important to ensure that the critique is based upon an accurate representation of the musician's performance.

One key way to accurately capture a musician's performance is by using quality audio equipment, such as microphones, wires, cables, speakers, sound mixers, and the like. That being said, even the best equipment may not provide optimal results if it is not configured correctly. One of the first steps in establishing an optimal configuration of audio equipment is identifying proper microphone location and positioning equipment at that location. In an effort to ensure sound is received with minimal interference and background noise, it is often preferable to mount a microphone directly onto a musical instrument, especially at or near a location at which sound is emitted.

A few devices currently exist that facilitate the attachment of a microphone to a musical instrument. However, many of these devices are more complex than necessary, are too time-consuming to use, and/or do not provide the necessary sound quality. For instance, some of these devices may involve the use of two hands, extra tools, and/or multiple steps in order to be attached, detached, and/or repositioned. During performance, devices should be used that allow the user to minimize the time and energy afforded to instrument preparation. Activities such as attaching microphones to one's instruments should be as quick and easy as possible while also providing the necessary quality.

Given the above, there is a need for devices which facilitate the ability of musicians to attach, detach, and/or reposition microphones or other sound capturing devices on their instruments in a simple and timely manner.

SUMMARY OF THE DISCLOSURE

The present disclosure provides mounting assemblies for the attachment of one or more devices, such as a microphone, to a host instrument, such as a drum.

One embodiment of a mounting device according to the present disclosure can include a body and a clamp each including respective clamping portions. The clamp can be mounted to the body such that it is slidable within a body aperture. A spring can be anchored at least partially within the body aperture and a clamp aperture.

One embodiment of a device for attaching an object to a drum hoop according to the present disclosure can include a body shaped to define a substantially vertical front channel, a substantially vertical rear aperture, and a substantially horizontal side recess. A clamp can be vertically movable in the front channel and a side button can be horizontally movable within the side recess. The side button can include a substantially vertical through-hole that can at least partially align with the rear aperture.

One embodiment of a clamping device for mounting an object to a drum hoop can include a body with a substantially vertical channel and a clamp with a substantially vertically oriented channel, the clamp being movable within the body channel. A spring can be within the spring channel and connected to a first anchor at or near a bottom of the body channel, and a second anchor at or near a top of the spring channel.

These and other further features and advantages of the disclosure would be apparent to those skilled in the art from the following detailed description, taken together with the accompanying drawings, in which:

BRIEF DESCRIPTION OF THE DRAWINGS

FIG. 2 is a perspective view of a mounting device grasping a microphone rod according to one embodiment of the present disclosure; and FIG. 3 is a side view of a mounting device grasping a microphone rod and attached to a drum hoop according to one embodiment of the present disclosure.

DETAILED DESCRIPTION OF THE DISCLOSURE

Figure 1:
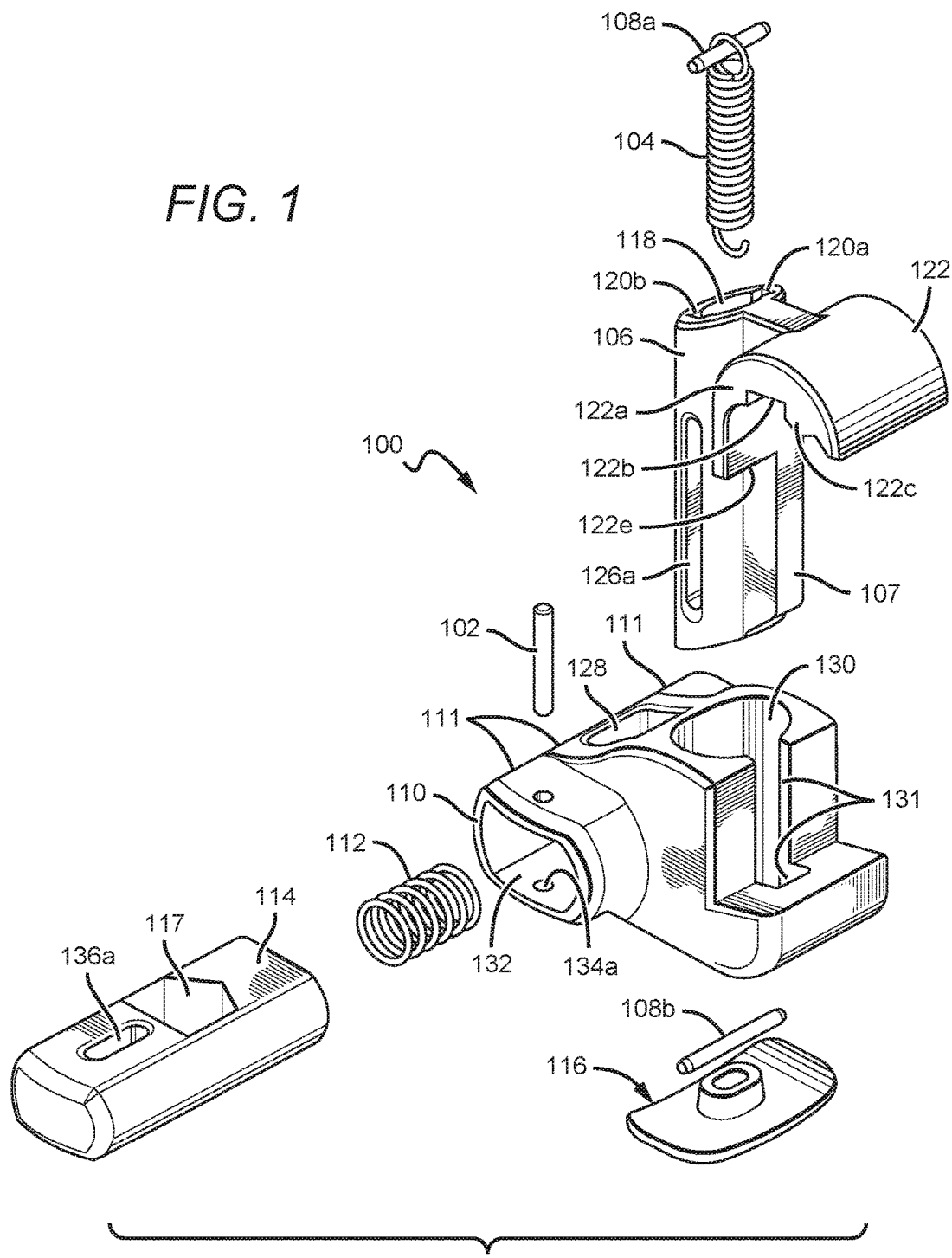
FIG. 1 is an exploded perspective view of a mounting device according to one embodiment of the present disclosure.

The present disclosure is directed to devices that facilitate the simple and timely attachment of an accessory such as a microphone to a host instrument such as a drum. Specifically, devices according to the present disclosure can include one clamping system for attachment of the entire mechanism to the host instrument, such as to the rim of a drum, and another clamping system for holding the accessory. One or more clamping systems can utilize a spring. Some devices according to the disclosure can be easily and quickly placed, removed, and/or adjusted using only one hand.

It is understood that when an element is referred to as being "on" another element, it can be directly on the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", "raise", "lower", and similar terms, may be used herein to describe relative relationships. It is understood that these terms are intended to encompass all relationships which could be reasonably conveyed by their use.

Although the terms first, second, etc., may be used herein to describe various steps, elements, components, regions and/or sections, these steps, elements, components, regions, and/or sections should not be limited by these terms. These terms are only used to distinguish one step, element, component, region, or section from another. Thus, unless expressly stated otherwise, a first step, element, component, region, or section discussed below could be termed a second step, element, component, region, or section without departing from the teachings of the present disclosure.

FIG. 1 is an exploded perspective view of a spring-enabled mounting device 100 according to one embodiment of the present disclosure. The mounting device 100 can comprise a body 110 and a clamp 106. The clamp 106 can be slidably receivable by a vertically-oriented or otherwise-oriented channel 130 within the body 110. The channel 130 can have many different cross-sections. In the embodiment shown the channel 130 has a cross-sections similar to that of the clamp 106, thereby facilitating vertical sliding motion of the clamp 106. Further, in the specific embodiment shown, the channel 130 includes a slot 131 for receiving a protrusion 107 of the clamp 106, although other embodiments may not include such a slot.

The mounting device 100 can also include a spring 104, which is biased to spring back to its original length upon a change in length. Specifically, in the device shown, the spring 104 is designed to be extended to a longer length and return to its original shorter length, and thus is an extension spring (also known as a tension spring), but it is understood that other similar embodiments the design can be altered to include a spring designed to be compressed to a shorter length and biased to return to its original longer length. Extension springs according to the present disclosure such as the spring 104 can be anchored such that they are in tension when the device is not in use, or are on the verge of tension when not in use; in such embodiments, when the user actuates the clamp 106 from its rest position, the spring 104 applies a force resisting an actuation attempting to extend the spring's length. Similarly, compression springs can be positioned so as to be in compression (or on the verge of compression) when a device is in its rest position, such that if user actuation causes further compression the compression spring resists.

The spring 104 can be anchored to the body 110 at one end and to the clamp 106 at its other end, such as by a hook or loop at the end of the spring attached to a rod or pin, or another anchoring system as is known in the art. While in some systems the spring 104 may be anchored to an outside surface of the body 110 and/or clamp 106, in the embodiment shown the spring 104 is located within a spring channel 118 within the clamp 106. Many different embodiments are possible.

In the specific embodiment shown, the spring 104 is anchored at its top to the clamp 106 and at its bottom to the body 110, although the reverse and/or other embodiments are possible. Specifically, the spring 104 is anchored at its top to a rod 108a, which is in turn permanently or removably attached to the clamp 106. In one embodiment, the rod 108a is attached within and at or near the top of the spring channel 118 and can traverse the spring channel 118. For example, the rod 108a can mate with notches 120a,120b within the clamp 106.

The spring can be anchored at its bottom to a rod 108b, which is in turn permanently or removably attached to the body 110. The rod 108b can be placed such that it traverses the channel 130 and/or such that it is at or near the bottom of the channel 130, and the device can be assembled such that the rod 108b passes through a guide including a first guide channel 126a and a second guide channel opposite the first guide channel (not shown). Thus, upon movement of the clamp 106 up, the rod 108b (which is fixed within the channel 130) will move to a point relatively lower in the guide 126, while upon movement of the clamp 106 down, the rod 108b will move to a point relatively higher in the guide. As shown, the guide 126 can have a height less than that of the entire clamp, which can enable attachment of the rod 108a in a manner so as to traverse the spring channel 118. The rod 108b can be configured to slide vertically within one or more guides such as the guide 126 while being confined to minimal or no horizontal movement due to, for example, the guide channels having a width substantially similar to or only slightly larger than the width or diameter of the rod 108b. Many different embodiments are possible.

The clamp 106 can include a protrusion 122 which is designed to apply downward force upon a device to be clamped. The protrusion 122 can be many different shapes, and here is shown as a hook shape. Similarly, the body 110 can include a lip 133 which is designed to apply upward force upon the device to be clamped, such that the device is held securely between the protrusion 122 and the lip 133 (the protrusion 122, the lip 133, and similar elements could also be referred to generally as "clamping elements" or "clamping portions"). Raising of the clamp 106 within the channel 130 increases the distance between the protrusion 122 and the lip 133 such that a device with a height equal to or greater than the rest distance between the protrusion 122 and the lip 133 can fit between these two elements, and be clamped due to the downward force applied by the protrusion 122 and the upward force from the lip 133 upon the object. These forces are applied primarily due to the spring 104, which pulls downward on the clamp 106. In this specific instance, the downward force of the spring 104 upon the clamp 106 is applied through the rod 108a, although many different embodiments are possible. The protrusion 122 can include a stop 122e which can abut the lip 133 when the mounting device 100 is in a rest position, preventing further downward movement of the clamp 106. The stop 122e can be a part of the protrusion 107, or in other embodiments is a separate element.

The minimum spacing between the protrusion 122 and lip 133 when at rest (or "rest spacing") can be designed for many different types of devices. For instance, some drum hoops have a height of approximately 3 cm. The rest spacing of the clamping elements (the protrusion 122 and lip 133) can be less than this height; thus, upon clamping the mounting device 100 onto the drum hoop, the spring 104 will be applying a force to the clamping elements in an attempt to return to the device's rest position. For instance, the rest spacing of the clamp elements can be between 0.25 cm and 2.75 cm, and/or between 1 cm and 2 cm, and/or about 1.5 cm. The rest spacing can be designed to be, for instance, 1 cm to 2 cm less than the device to be clamped. The above measurements are exemplary only, and can be designed based on many different user preferences and/or the type and dimensions of device to be clamped.

It is noted that while the discussion herein uses the body 110 as a frame of reference; were the clamp 106, for instance, used as such a frame of reference, then the spring could be said to be applying an upward pulling force upon the body 110.

The protrusion 122 can be many different shapes, with exemplary shapes being generally round or square hook shapes such as the generally round hook shape shown. The use of a general hook shape can enable the protrusion 122 to engage multiple sides of the same object. Further, the inner portion 122a of the protrusion can include indentations and projections for aiding in the clamping of an object. For instance, FIG. 1 shows a protrusion 122 including an indentation 122b and a projection 122c. This specific embodiment is designed to clamp the upper edge of a drum hoop 300, as best shown in FIG. 3. In this specific embodiment, the drum hoop 300 can be clamped such that the top portion 302 of the drum hoop 300 is within the indentation 122b, and/or the top portion 302 is held between the protrusion 122c and one or more walls of the indentation 122b. Many different shapes including indentations and/or protrusions such as those shown in this specific embodiment are possible. Drum hoops similar to the drum hoop 300 are shown and described in U.S. Pat. No. 8,563,841 to Good and entitled "Safety Hoop for Drum," and U.S. patent application Ser. No. 13/694,519 to Good and entitled "Precision True Hoop for Drum", each of which is fully incorporated by reference herein in its entirety.

Similar to the protrusion 122, the lip 133 can be many different shapes. As the specific embodiment shown in FIGS. 1-3, the lip 133 includes a generally upwardly angling surface 133a. The upward angle of this surface can help to secure a clamped device and prevent or reduce the possibility of detachment. The lip 133 can protrude outward form the remainder of the body less than the protrusion 122, since as shown above, certain drum hoops may include a bottom portion which flares out. This type of protrusion/lip arrangement can provide better engagement with a drum hoop surface.

Protrusions and lips according to the present disclosure can take many different shapes, and the above specific embodiment should not be considered limiting. For instance, the lip 133 can have a shape similar to the protrusion 122, and/or the protrusion 122 can have a shape similar to the lip 133, or both may have other shapes. Many different embodiments are possible.

The clamp 106 can be actuated in many different manners. In the specific embodiment shown, the clamp 106 includes a button 116. The button 116 is attached to the bottom of the clamp such that a user can actuate the clamp 106 by pushing upon the button 116. This can be useful for, for instance, drummers, who can actuate the button 116 easily with one hand (with, e.g., the thumb pressing upon the button 116) in order to easily and quickly release pressure upon a clamped device (e.g., a drum hoop) so as to adjust the mounting device 100. Many different actuation methods and devices are possible.

The spring 104 should be biased in order to provide a secure clamp, while also enabling easy adjustment by a user. As previously discussed, many prior art devices utilize wing nuts or similar devices which are user-tightened and can become loose while performing. The use of a spring 104 in the mounting device 100 has distinct advantages over such devices in that the spring 104 can be designed so as to not apply a force that will cause damage to, for instance, a drum hoop or clamp, which may occur during user tightening of a wing nut. Further, because of the constant spring force of the spring 104, the mounting device 100 will not become loose due to, for example, jostling that causes loosening or unscrewing.

Embodiments of the mounting devices according to the present disclosure, including but not limited to the mount device 100, can also include a mechanism for holding a device to be mounted to, for instance, a drum hoop such as the drum hoop 300 shown in FIG. 3. This mechanism for the mounting device 100 can include a compression spring 112, although it is understood that the device can be otherwise arranged for a different type of device spring, such as an extension spring. The compression spring 112 can be in a recess in a mechanism such as the side button 114, or can simply abut the side button 114. The side button 114 or similar device can then be placed within a side opening 132 of the body 110. The body can comprise a chamber, such as a rear chamber, which defines the side opening 132, which can be a substantially horizontal or otherwise-oriented side opening. The side button 114 can then be anchored into place using a rod 102 and guide 136a; as can be seen in FIG. 1, as the side button 114 is placed within the side opening 132 of the body 110, the guide 136a can align with rod holes 134 or similar. The rod 102 can then be placed through the rod holes 134 and guide 136a and fixed in place. It is noted that while a "side" opening and a "side" button are described herein, the opening and/or button can be otherwise-oriented and/or located elsewhere Once assembled, the side button 114 can be substantially limited to linear movement into and out of the side opening 132 of the body, such as, e.g., substantially horizontal movement. The compression spring 112 will resist movement into the side opening 132, and can push the side button 114 back outward if no external force is being applied until the rod 102 engages an end of the guide 136a.

The side button 114 can include a through-hole 117, which can be substantially vertical or otherwise-oriented. While the through-hole 117 is shown in FIG. 1 as having a five-sided shape, many different shapes are possible, including but not limited to regular polygons such as a hexagon and irregular polygons. The body 110 and/or chamber 111 can include an aperture 128 which can be substantially vertical or otherwise-oriented, and which can be the same shape or a different shape than the through-hole 117, including any of the shapes described above. When the side button 114 is pushed inward far enough into the side opening 132, the aperture 128 and through-hole 117 can substantially align and/or overlap, enabling the placement of an object through the aperture 128 and through-hole 117. For instance, FIG. 2 shows a microphone rod 202 placed through the aperture 128 and through-hole 117 (not shown). The microphone rod 202 can include a bendable neck for further positioning adjustment. After placement of the object through the aperture 128 and through-hole 117, a user can reduce or remove the force upon the side button 114, and the spring 112 will cause the side button 114 to move outward. The clamped object, in this case the microphone rod 202, will then be clamped between the sidewalls 128a of the aperture 128 and the sidewalls of the through-hole 117. The clamped object will then be substantially secured.

The clamped object (e.g., the microphone rod 202) can be removed by pressing the side button 114 inward, thus releasing the clamping force upon the object such that it can be pulled out of the aperture 128 and through-hole 117.

While the specific embodiment of FIG. 2 shows a microphone rod 202 placed within the mounting device 100, it is understood that many different types of objects can be clamped within the mounting device 100 and then mounted, via the mounting device, to a host instrument. For example, a percussion accessory instrument as described in U.S. Provisional Pat. App. No. 62/086,705 to Krol et al. and entitled "Clip-On Mounting Assembly for Musical Instruments," filed on Dec. 2, 2014, and the corresponding utility patent application U.S. patent application Ser. No. 14/957, 462 to Krol et al. and entitled "Clip-On Mounting Assembly for Musical Instruments," filed on Dec. 2, 2015, describe different types of percussion accessory instruments which could be attached to a drum and/or drum hoop using the clamping devices described herein, as well as additional clamping devices and components which can be used in embodiments of the present disclosure. Each of these applications is fully incorporated by reference herein in its entirety. Other devices can be clamped by these devices as well, and the above examples should not be considered limiting.

The rods 102,108a,108b described above can take many different shapes and dimensions. For instance, the rod 102 can have a diameter or width of about 0.05" to about 0.15", and/or about 0.08" to about 0.10", and/or about 0.09375". The slotted spring pin 102 can have a length of about 0.25" to about 0.75", and/or about 0.4" to about 0.6", and/or about 0.5". The rods 108a,108b can be longer or shorter than the rod 102. In one embodiment, the rods 108a,108b can have a diameter or width approximately equal to the diameter or width of the rod 102. In one specific embodiment, the rods 108a,108b can have a diameter or width of about 0.05" to about 0.15", and/or about 0.08" to about 0.10", and/or about 0.09375". In one embodiment, the rods 108a,108b can have a length of about 0.5" to about 1.0", or about 0.65" to about 0.85", or about 0.75". The rods 108a,108b can have dimensions similar to or the same as one another, or different front one another. It is understood that different pins including but not limited to slotted spring pins, bolts, nails, rods, and similar structures may be used in place of the rods 102, 108a,108b. Similarly, the button 114 and/or the button 116 can be replaced by other mechanisms for engaging the extension spring 104 and/or the compression spring 102, as would be apparent to those skilled in the art, including but not limited to levers, switches, clips, and the like.

In one embodiment, the device 100 does not attach to a musical instrument or audio device; in such an embodiment, the device 100 may attach to any object capable of being received by the device 100 as would be apparent to one of skill in the art. For example, such objects could include furniture, vehicles, and other structures. Similarly, any object may be received by the device 100 that fits within the body aperture 128, as would be apparent to one of skill in the art, including but not limited to one or more microphone rods such as the microphone rod 202, musical instruments, speakers, instrument accessories, and similar.

As would be understood by one of skill in the art, the devices described above can include many different materials, including but not limited to semi-rigid and/or rigid polymers and/or metals or similar materials.

Although the present disclosure has been described in detail with reference to certain preferred configurations thereof, other versions are possible. Therefore, the spirit and scope of the disclosure should not be limited to the versions described above.

We claim:

1. A mounting device for attachment to a musical instrument, said mounting device comprising:
   a body comprising a first clamping portion and shaped to define a body aperture;
   a clamp comprising a second clamping portion, said clamp slidably mounted at least partially within said body aperture and shaped to define a clamp aperture;
   a spring at least partially within said body aperture and at least partially within said clamp aperture;
   wherein said spring is anchored by a first rod at or near the bottom of said body aperture and a second rod at or near the top of said clamp aperture.

2. The mounting device of claim 1, wherein said spring is an extension spring.

3. The mounting device of claim 2, wherein said device is configured such that the resting position of said spring is in tension.

4. The mounting device of claim 1, wherein said clamp is shaped to define a guide;
   wherein said clamp is slidable within said body aperture such that said first rod is movable within and relative to said guide.

5. The mounting device of claim 1, further comprising a button at a bottom of said clamp;
   wherein a user can move said clamp within said body aperture by applying a force to said button.

6. The mounting device of claim 1, wherein said body is shaped to define a side recess, and further comprising;
   a second spring within said side recess, wherein said second spring is a compression spring;
   a side button at least partially within said side recess and configured to abut said second spring;
   wherein said side button is slidably movable within said side recess so as to compress said spring.

7. The mounting device of claim 6, wherein said body is shaped to define a second aperture and said side button is shaped to define a through-hole;
   wherein said mounting device is configured such that said second aperture and said through-hole can be at least partially aligned upon the movement of said side button into said side recess by a first distance.

8. The mounting device of claim 7, wherein said second aperture and said through-hole are approximately vertical.

9. The mounting device of claim 8, wherein said mounting device is configured to hold an object between sidewalls of said second aperture and said through-hole.

10. The mounting device of claim 9, wherein said mounting device is configured to release said object upon a first pressure being applied to said side button such that said side button moves further into said side recess.

11. The mounting device of claim 1, wherein said mounting device is configured to hold a drum hoop between said first and second clamping portions.

12. The mounting device of claim 1, wherein one or both of said first and second clamping portions comprises an inner surface comprising an indentation or a projection.

13. The mounting device of claim 1, wherein one or both of said first and second clamping portions is generally hook-shaped.

14. The mounting device of claim 1, wherein said second clamping device comprises a stop which prevents downward movement of said clamp.

15. The mounting device of claim 1, wherein said second clamping portion extends further than said first clamping portion.

16. The mounting device of claim 1, wherein said second clamping portion is above said first clamping portion.

17. A device for attaching an object to a drum hoop, said device comprising:
    a body comprising a rear chamber, said body shaped to define a substantially vertical front channel and a substantially vertical rear aperture, and said rear chamber shaped to define a substantially horizontal side recess;
    a clamp vertically movable within said front channel; and
    a side button shaped to define a substantially vertical through-hole, said side button horizontally movable within said side recess so as to at least partially align said rear aperture and said through-hole.

18. The device of claim 17, further comprising a compression spring in said side recess and between said side button and said body.

19. The device of claim 18, wherein said clamp comprises a substantially vertical chamber, and wherein said device further comprises an extension spring within said substantially vertical chamber.

* * * * *